(12) United States Patent
Bodtker et al.

(10) Patent No.: US 9,664,237 B2
(45) Date of Patent: May 30, 2017

(54) SECTOR JOURNAL BEARING

(71) Applicant: STEERING SOLUTIONS IP HOLDING CORPORATION, Saginaw, MI (US)

(72) Inventors: Joen C. Bodtker, Gaines, MI (US); Gregory D. Brzezinski, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 90 days.

(21) Appl. No.: 14/529,896

(22) Filed: Oct. 31, 2014

(65) Prior Publication Data

US 2016/0123404 A1 May 5, 2016

(51) Int. Cl.
*B23P 15/00* (2006.01)
*F16D 3/38* (2006.01)
*F16C 17/02* (2006.01)
*F16C 11/06* (2006.01)

(52) U.S. Cl.
CPC .............. *F16D 3/385* (2013.01); *B23P 15/00* (2013.01); *B23P 15/003* (2013.01); *F16C 11/0614* (2013.01); *F16C 17/02* (2013.01); *F16D 3/38* (2013.01); *B23P 2700/11* (2013.01); *F16C 2361/41* (2013.01); *Y10T 29/49989* (2015.01)

(58) Field of Classification Search
CPC ..... B23P 15/003; B23P 2700/11; F16C 17/02; F16D 3/205; F16D 3/2052; F16D 3/38; F16D 3/385; F16D 3/40; F16D 3/42; Y10T 29/49989

USPC ....... 464/114, 119, 125, 126, 132, 136, 905; 29/527.6
See application file for complete search history.

(56) References Cited

U.S. PATENT DOCUMENTS

| | | | |
|---|---|---|---|
| 4,067,626 A | 1/1978 | McElwain | |
| 4,073,162 A * | 2/1978 | DeBisschop | F16D 3/40 411/533 |
| 4,498,888 A * | 2/1985 | Pastor | F16D 3/38 464/136 |
| 4,534,274 A * | 8/1985 | Ripberger | F16J 1/16 123/193.6 |
| 4,579,546 A * | 4/1986 | Pastor | F16D 3/38 464/136 |
| 5,331,932 A * | 7/1994 | Watanabe | F02F 3/027 123/193.6 |
| 6,279,456 B1 * | 8/2001 | Ueshima | F16J 1/18 92/153 |
| 6,656,053 B2 * | 12/2003 | Chang | F16C 11/00 403/146 |

(Continued)

*Primary Examiner* — Josh Skroupa
(74) *Attorney, Agent, or Firm* — Cantor Colburn LLP

(57) ABSTRACT

A universal joint assembly includes a hollow upper shaft, a lower shaft extending at least partially within the upper shaft, and a cage having a plurality of bearing apertures. Each bearing aperture includes a pair of opposed loading pads having a distinct inner wall surface sector extending radially inward into the at least one bearing aperture. The cage receives at least a portion of the lower shaft and is positioned within the hollow upper shaft. The assembly further includes at least one upper tilt pin extending through the upper shaft and a bearing aperture of the plurality of bearing apertures, and a lower tilt pin extending through the lower shaft and a bearing aperture of the plurality of bearing apertures.

20 Claims, 3 Drawing Sheets

(56) References Cited

U.S. PATENT DOCUMENTS

| | | | | |
|---|---|---|---|---|
| 6,830,516 B2 * | 12/2004 | McCormick | ............. | F16D 3/42 |
| | | | | 29/898.07 |
| 7,246,552 B2 * | 7/2007 | Schroeder | ................ | F02F 3/00 |
| | | | | 403/150 |
| 8,333,526 B2 * | 12/2012 | Long | ......................... | F16D 3/38 |
| | | | | 403/57 |
| 8,500,565 B2 * | 8/2013 | Billman | ................. | F16D 3/382 |
| | | | | 464/136 |
| 2002/0165031 A1 * | 11/2002 | Riefe | ....................... | F16D 3/38 |
| | | | | 464/112 |

* cited by examiner

SECTOR JOURNAL BEARING

FIELD OF THE INVENTION

The subject invention relates to universal joints, and more particularly to a steering column universal joint having sector loading pads.

BACKGROUND OF THE INVENTION

Universal joints are typically used to transfer torque between two shafts. Some universal joints include a trunion that rotates between input and output yokes. Steering column universal joints may use a molded plastic cage as the trunion while the yokes have pins affixed to them. The pins may be press-fit into apertures in the cage but still allow the cage to spin. The press-fit may be required to eliminate lash. However, it may also add friction when the joint is rocked. Accordingly, it is desirable to provide a universal joint with reduced friction between the cage and the pins.

SUMMARY OF THE INVENTION

These and other advantages and features will become more apparent from the following description taken in conjunction with the drawings.

In one aspect of the invention, a cardan joint cage is provided. The Cardan joint cage includes at least one bearing aperture having an inner wall surface and a pair of opposed loading pads extending radially inward into the at least one bearing aperture.

In another aspect of the invention, a universal joint assembly is provided. The assembly includes a hollow upper shaft, a lower shaft extending at least partially within the upper shaft, and a cage having a plurality of bearing apertures. Each bearing aperture includes a pair of opposed loading pads having a distinct inner wall surface sector extending radially inward into the at least one bearing aperture. The cage receives at least a portion of the lower shaft and is positioned within the hollow upper shaft. The assembly further includes at least one upper tilt pin extending through the upper shaft and a bearing aperture of the plurality of bearing apertures, and a lower tilt pin extending through the lower shaft and a bearing aperture of the plurality of bearing apertures.

In yet another aspect of the invention, a method of fabricating a cardan joint cage is provided. The method includes forming the cardan joint cage with at least one bearing aperture and removing material form a portion of the circumference of the bearing aperture to define a pair of opposed loading pads extending radially inward into the at least one bearing aperture.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
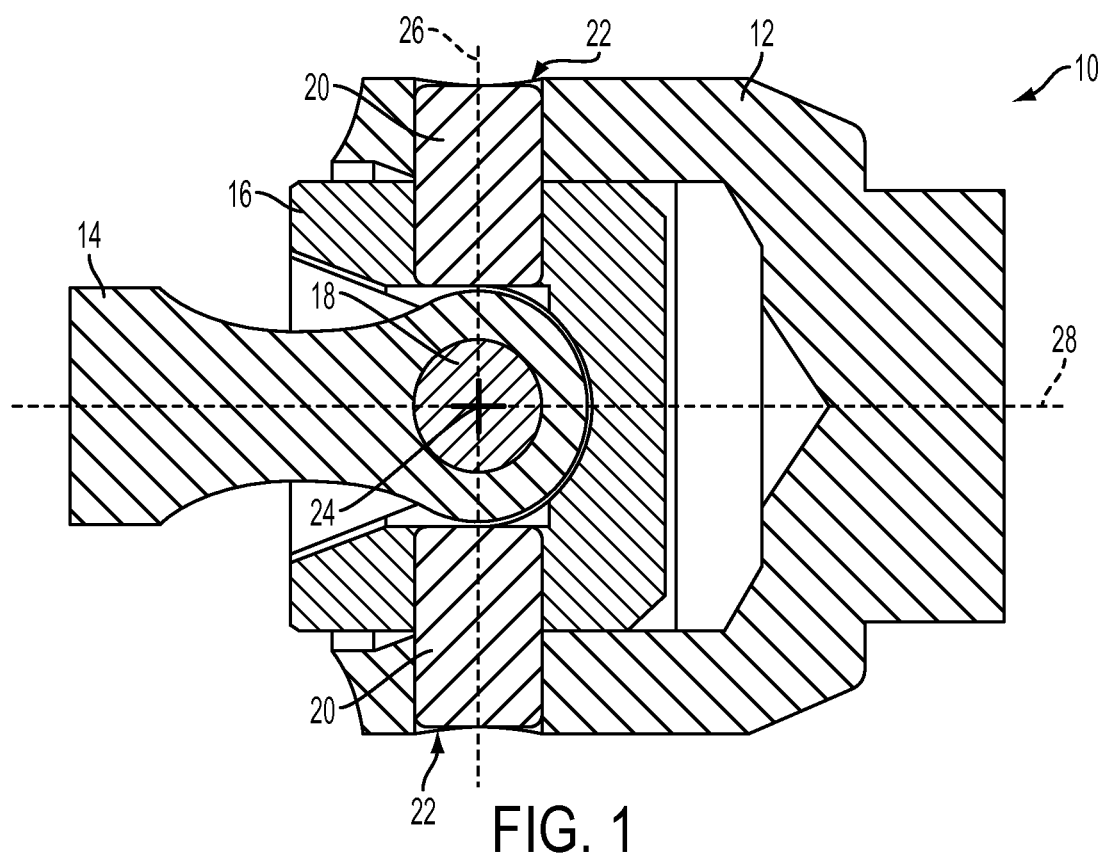
FIG. 1 is a cross-sectional view of an exemplary embodiment of a universal joint assembly according to the disclosure.
Figure 2:
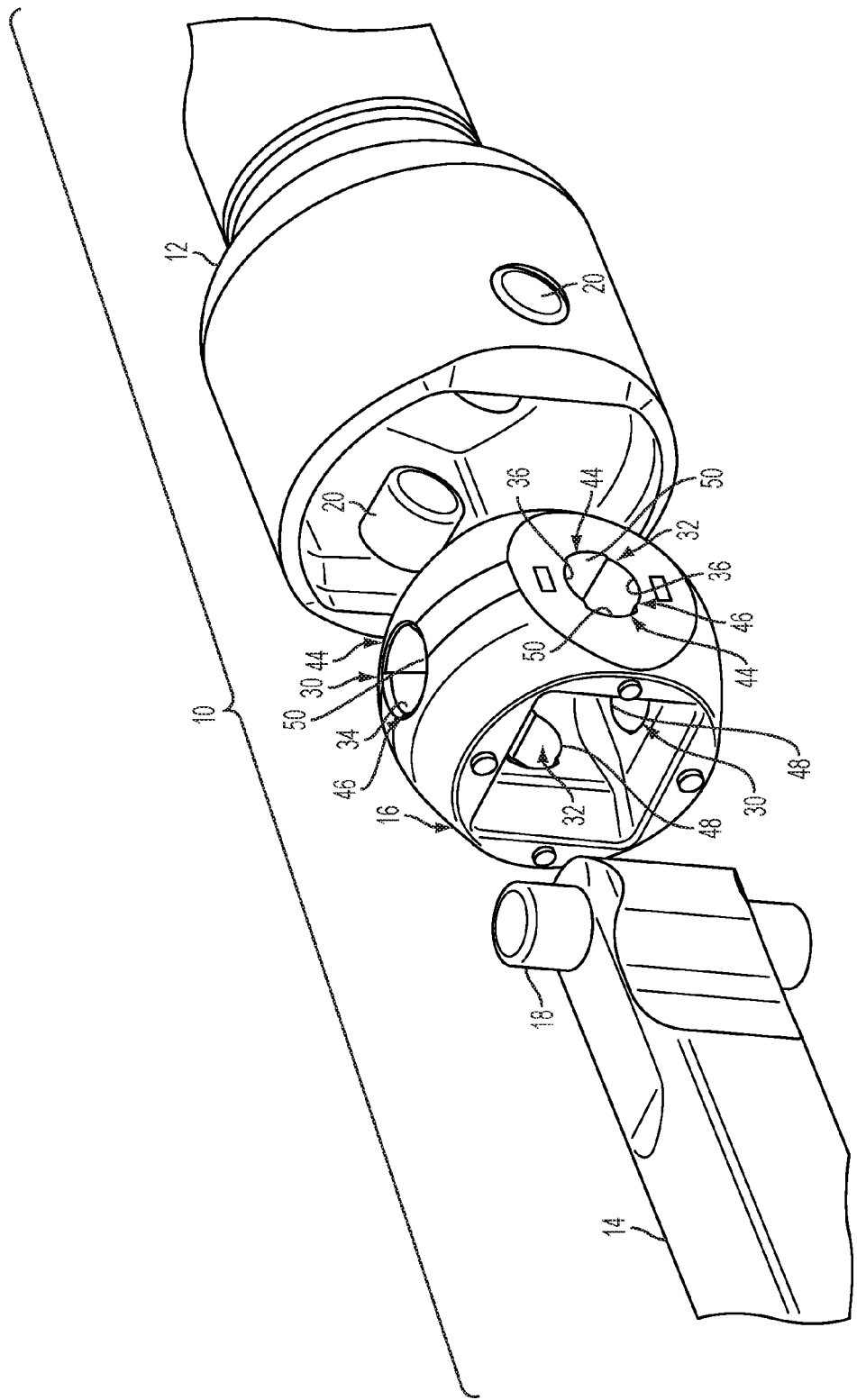
FIG. 2 is a perspective view of another exemplary embodiment of a universal joint assembly according to the disclosure.

Referring now to the Figures, where the invention will be described with reference to specific embodiments, without limiting same, FIG. 1 illustrates a side cross-section of an exemplary cardan joint or universal joint assembly 10, and FIG. 2 illustrates a perspective view of universal joint assembly 10 before assembly.

Universal joint (U joint) assembly 10 and specifically cardan joint assembly 10 includes an upper shaft 12, a lower shaft 14, a cardan joint cage 16, a lower tilt pin 18, and upper tilt pins 20 extending through apertures 22 formed in upper shaft 12. Assembly 10 includes a first axis 24 that allows lower shaft 14 to pivot inside cage 16 and a second axis 26 that allows cage 16 to pivot inside upper shaft 12. Axes 24 and 26 are in one plane perpendicular to both each other and to a spin axis 28 of U-joint assembly 10. U-joint assembly 10 is pivotable to transmit torque from upper shaft 12 through cage 16 to lower shaft 14.

As shown in FIG. 2, cage 16 includes journal bearing apertures 30 to receive lower tilt pin 18 and journal bearing apertures 32 to receive upper tilt pins 20. Bearing apertures 30 include an inner wall surface 34 and bearing apertures 32 include an inner wall surface 36. Typically, inner wall surfaces 34, 36 contact respective pins 18, 20 over the entire 360° surface of inner wall surfaces 34, 36, which contributes 360° of frictional contact between inner walls 34, 36 and pins 18, 20 when rocking joint assembly 10. However, because a load path 40 in cage 16 is generally bi-directional in a transverse plane 42 (FIG. 3B) of cage 16, friction between cage 16 and pins 18, 20 is reduced by removing material in unloaded portions 44 of bearings apertures 30, 32, forming inner wall surfaces 50 that are discontiguous with inner wall surfaces 34, 36. Specifically, the inner wall surfaces 34, 36 form a first concentric cylinder 52 having sectors that are not contiguous with the adjoining or adjacent sectors of a second concentric cylinder 54 formed by inner wall surfaces 50.

Figure 3B:
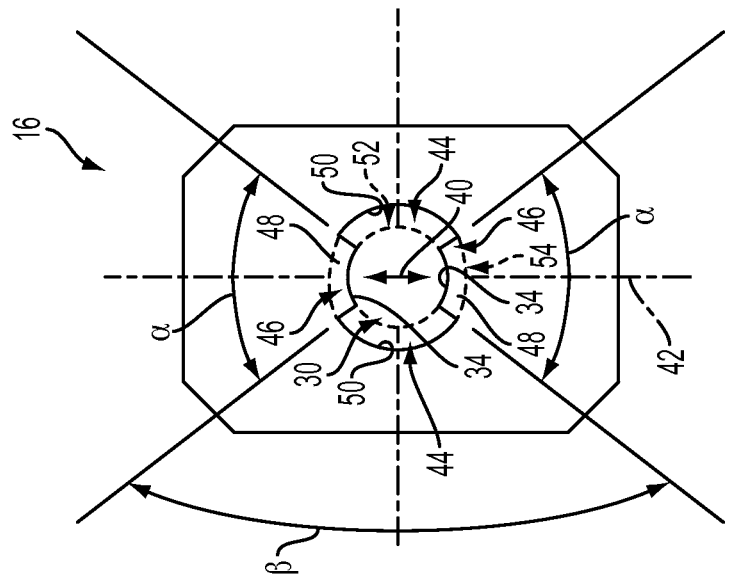
FIG. 3B is a cross-sectional view of an exemplary embodiment of a cardan joint cage according to the disclosure.
Figure 3A:
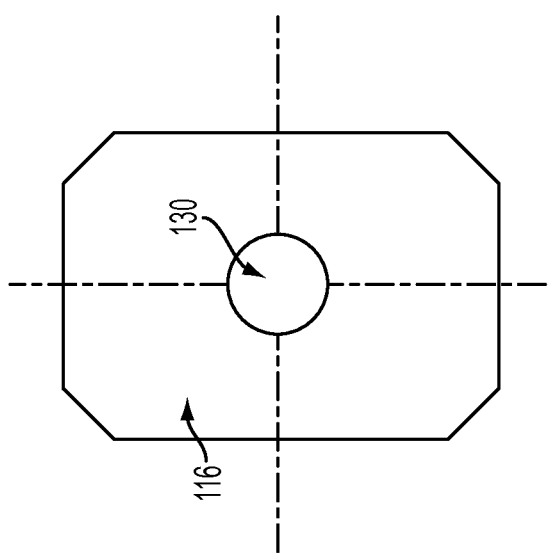
FIG. 3A is a cross-sectional view of a prior art cage.

FIG. 3A illustrates a prior art cage 116 having a bearing aperture 130, and FIG. 3B illustrates cage 16 compared to prior art cage 116. As shown in FIG. 3B, material is removed from unloaded portions 44 of bearing aperture 30. Although not shown, bearing apertures 32 may be modified in the same way as bearing apertures 30. After removal of material from unloaded portions 44, material remains in bearing portions 46 about a portion of the circumference of bearing aperture 30. As such, opposed bearing or loading pads 48 are defined in a sector of the circumference of bearing aperture 30.

In the exemplary embodiment, stiffness of the connection between cage 16 and pins 18, 20 is not reduced because the material of the original bearing area 46 remains. However, friction between cage 16 and pins 18, 20 is reduced due to removal of material in unloaded portions 44; material that caused unnecessary interference with pins 18, 20 and contributed to friction when the joint assembly was rocked. With the modification of cage 16 occurring only with the geometry of bearings apertures 30, 32, there is no cost increase to cage 16. Further, this design allows an increase in aperture tolerances for a given material without creating lash while maintaining current frictional tolerances.

With material removed from unloaded portions 44, each loading pad 48 extends radially inward into bearing aperture 30, 32 and defines a sector of concentric cylinder 52 having a radial angle 'α' (FIG. 3B). In the exemplary embodiment, radial angle 'α' of each sector loading pad 48 may be varied based on the magnitude of load 40 and the magnitude of the pivot angle (i.e., how far cage 16 oscillates around pin 18, 20). For example, radial angle 'α' may be between 15° and 120° or between approximately 15° and approximately 120°. In another example, radial angle 'α' may be between 75° and 105° or between approximately 75° and approximately 105°. In yet another example, radial angle 'α' is 90° or approximately 90°. However, radial angle 'α' may be any suitable angle that enables cage 16 to function as described herein. Additionally, radial angle 'α' may be varied depending on the stiffness of the material used to fabricate cage 16. For example, the radial angle 'α' of loading pad 48 (corresponding to the size of loading pad 48) may be reduced when cage 16 is fabricated from a relatively stiffer material. In a similar manner, the size of leading pad 48 may be increased when cage 16 is fabricated from a relatively compliant material.

Inner wall surfaces 50 define sectors of concentric cylinder 54 having a radial angle 'β' (FIG. 3B). In the exemplary embodiment, radial angle 'β' of each sector unloaded portion 44 may be varied based on the magnitude of load 40 and the magnitude of the pivot angle (i.e., how far cage 16 oscillates around pin 18, 20). For example, radial angle 'β' may be between 60° and 165° or between approximately 60° and approximately 165°. In another example, radial angle 'β' may be between 75° and 105° or between approximately 75° and approximately 105°. In yet another example, radial angle 'β' is 90° or approximately 90°. However, radial angle 'β' may be any suitable angle that enables cage 16 to function as described herein.

Alternative to the removal of material from unloaded area 44, cage 16 may be formed with bearing apertures 30, 32 having a larger diameter than pins 18, 20, and loading pads 48 may be subsequently coupled to bearing aperture inner walls 34, 36 in bearing area 46. In yet other alternatives, a slot may be molded with a long axis greater than pin diameter and then recesses are machined to create the load pads, a slot may be machined in the recess, or cage 16 may be formed from powder metallurgy or cast (e.g., die cast, investment cast, or metal injection molding).

A method of fabricating cardan joint cage 16 includes forming cage 16 with bearing apertures 30, 32 to receive lower and upper tilt pins 18, 20. Material from unloaded portions 44 of bearing aperture inner walls 34, 36 is removed to define concentric cylinders 52, 54 having discontiguous adjoining walls 50 and 34, 36. As such, loading pads 48 are defined in bearing portions 46 of the material of the circumference of bearings apertures 30, 32.

Described herein are systems and methods for reducing frictional contact in a universal joint assembly. The system includes a cardan joint cage having bearing apertures to receive tilt pins of the U-joint assembly. Material is removed from unloaded portions of the bearing apertures, which creates a clearance in the areas outside the tilt pin load path and reduces the friction area between the tilt pins and the cage. As such, rotating friction of the system is reduced while high torsional stiffness of the cage is maintained.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A cardan joint cage comprising:
a rotatable cardan joint cage, the cardan joint cage configured to rotatably couple a first shaft and a second shaft of a universal joint assembly having a spin axis;
a first opposed pair of bearing apertures disposed in the cage about a first axis perpendicular to the spin axis;
a second opposed pair of bearing apertures disposed in the cage about a second axis perpendicular to the spin axis, the first axis and the second axis perpendicular to one another; and
each of the bearing apertures having an inner wall surface and a pair of opposed loading pads extending radially inward into the at least one bearing aperture, the opposed loading pads oriented along a predetermined load path in a transverse plane of the cage that is transverse relative to the spin axis.

2. The cardan joint cage of claim 1, wherein the opposed loading pads are discontiguous along the inner wall surface.

3. The cardan joint cage of claim 1, wherein each loading pad of the pair of opposed loading pads is a non-adjoining sector of a circumference of the at least one bearing aperture, the sector defining a portion of the circumference having a sector radial angle.

4. The cardan joint cage of claim 3, wherein the sector radial angle is between 15° and 120°.

5. The cardan joint cage of claim 3, wherein the sector radial angle is between 75° and 105°.

6. The cardan joint cage of claim 3, wherein the sector radial angle is approximately 90°.

7. The cardan joint cage of claim 1, wherein the opposed loading pads have a loading pad size corresponding to the predetermined load path.

8. A universal joint assembly comprising:
a hollow upper shaft;
a lower shaft extending at least partially within the upper shaft;
a rotatable joint cage having a plurality of bearing apertures comprising a first opposed pair of bearing apertures disposed in the cage about a first axis perpendicular to a spin axis of the assembly and a second opposed pair of bearing apertures disposed in the cage about a second axis perpendicular to the spin axis, the first axis and the second axis perpendicular to one another, each bearing aperture having a pair of opposed loading pads having a distinct inner wall surface sector extending radially inward into the at least one bearing aperture, the opposed loading pads oriented along a predetermined load path in a transverse plane of the cage that is transverse relative to the spin axis, the cage receiving at least a portion of the lower shaft, the cage positioned within the hollow upper shaft;
at least one upper tilt pin extending through the upper shaft and the first opposed pair of bearing apertures; and
a lower tilt pin extending through the lower shaft and the second opposed pair of bearing apertures.

9. The assembly of claim 8, wherein the inner wall surface of each bearing aperture includes sectors that are discontiguous with the inner wall surface of opposed loading pads.

10. The assembly of claim 8, wherein each loading pad of the opposed loading pads is a sector of a circumference of its respective bearing aperture, the sector defining a portion of the circumference having a sector radial angle.

11. The assembly of claim 10, wherein the sector radial angle is between 60° and 120°.

12. The assembly of claim 10, wherein the sector radial angle is between 75° and 105°.

13. The assembly of claim 10, wherein the sector radial angle is approximately 90°.

14. The assembly of claim 8, wherein the opposed loading pads have a loading pad size corresponding to the predetermined load path.

15. A method of fabricating a rotatable cardan joint cage, the method comprising:
    forming the rotatable cardan joint cage, the cardan joint cage configured to rotatably couple a first shaft and a second shaft of a universal joint assembly having a spin axis with a first opposed pair of bearing apertures disposed in the cage about a first axis perpendicular to the spin axis and a second opposed pair of bearing apertures disposed in the cage about a second axis perpendicular to the spin axis, the first axis and the second axis perpendicular to one another; and
    removing material from a portion of the circumference of each bearing aperture to define a pair of opposed loading pads extending radially inward into each aperture, the opposed loading pads oriented along a predetermined load path in a transverse plane of the cage that is transverse relative to the spin axis.

16. The method of claim 15, wherein the step of removing material further comprises removing material from an area that is unloaded by a load path in a transverse plane of the cage.

17. The method of claim 15, further comprising defining each loading pad as a sector of the circumference of the at least one bearing aperture, the sector defining a portion of the circumference having a sector radial angle that defines a loading pad size.

18. The method of claim 17, further comprising forming the sector radial angle between 15° and 120°.

19. The method of claim 17, further comprising forming the sector radial angle between 75° and 105°.

20. The method of claim 17, further comprising forming the sector radial angle as approximately 90°.

\* \* \* \* \*